Dec. 8, 1970  P. E. DUNN  3,546,518
IMAGE PROJECTION THROUGH REAR WINDOW OF CATHODE
RAY TUBE TO DISPLAY SCREEN
Filed April 23, 1968
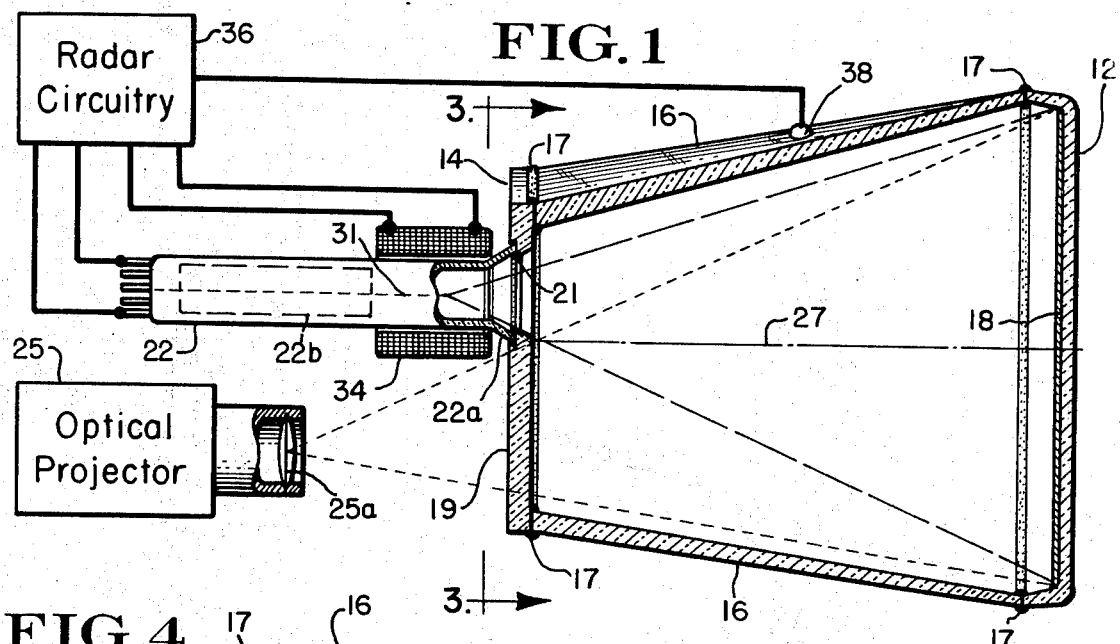
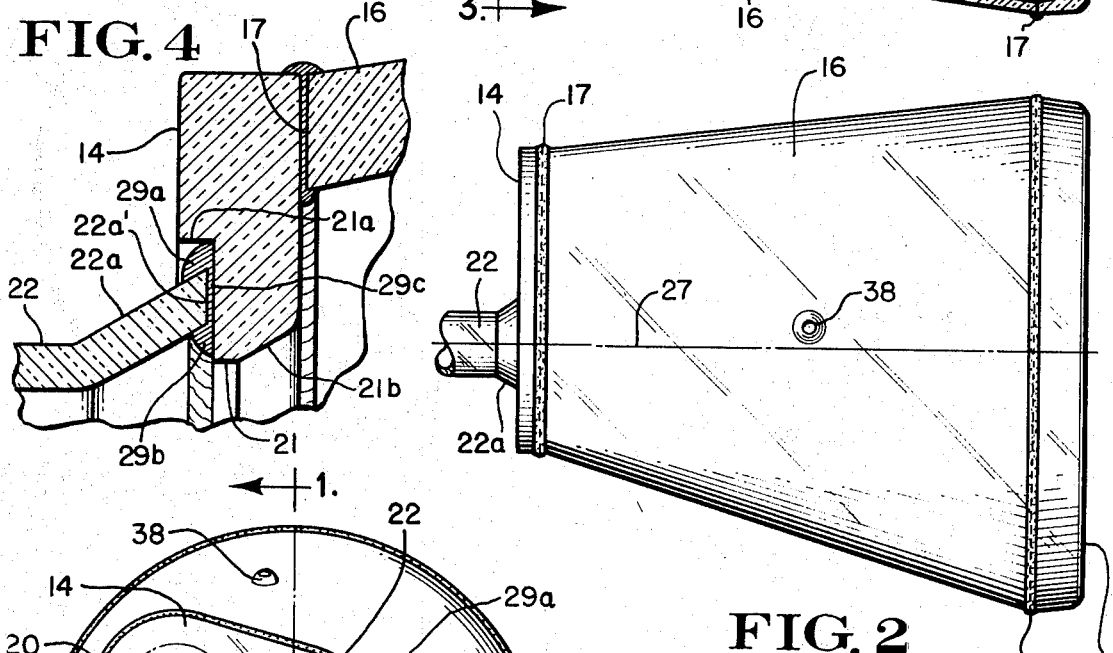
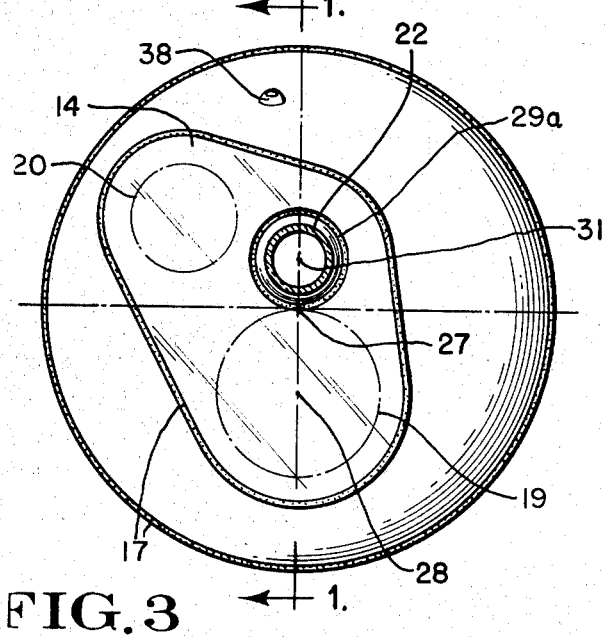
Inventor
Peter E. Dunn
By James E. Tracy
Attorney

# United States Patent Office 3,546,518
Patented Dec. 8, 1970

3,546,518
IMAGE PROJECTION THROUGH REAR WINDOW
OF CATHODE RAY TUBE TO DISPLAY SCREEN
Peter E. Dunn, Evanston, Ill., assignor to The Rauland
Corporation, Chicago, Ill., a corporation of Illinois
Filed Apr. 23, 1968, Ser. No. 723,472
Int. Cl. H01j 31/12, 61/35, 29/00
U.S. Cl. 313—92                                                     6 Claims

ABSTRACT OF THE DISCLOSURE

The separation between the neck and the projection window of a rear projection CRT may be minimized by forming the window in a flat rear glass plate, which is parallel to the tube's phosphor display screen, and by frit sealing the neck to the periphery of an aperture in the rear plate. Frit sealing produces no appreciable distortion in the rear plate and thus the window, which should be optically flat and clear, may be positioned immediately adjacent to the neck. Such minimum spacing simplifies the optics required and enhances the registration or alignment between a video presentation, developed on the display screen by the tube's electron beam, and a related visual image which is projected through the window onto the display screen and superimposed on the video pattern.

---

This invention relates to a novel cathode ray tube (CRT) for use in a display system in which an optical image is to be superimposed on and added to a video presentation.

Rear projection cathode ray tubes for simultaneously producing and overlaying a video display and an optically projected display on the same common phosphor screen find useful application in a variety of different environments. As one example, such a CRT may be employed in high speed aircraft for navigational purposes, as is the case in the embodiment to be described. A transparency film projector, controlled in accordance with the plane's speed and heading, optically projects through a rear window and onto the tube's phosphor screen a moving navigational map or chart of the geographical area over which the plane is flying. Concurrently, the tube's electron beam may be controlled by radar equipment to develop on the phosphor screen, and superimposed on the moving chart, a video or radar display of the area beneath the plane. Sophisticated apparatus is available to synchronize the optical projection and radar displays so that they coincide; namely, at any given instant the specific area illustrated by the projected navigational chart is made identical to and oriented with the area illustrated by the radar presentation. The two displays are thus maintained in registration or alignment with the result that the radar display is always augmented by the moving map. Such a combination of displays substantially simplifies navigation for the pilot, particularly at night or when the ground is obscured by clouds or overcast.

Of course, precise registration of the video and visual displays is absolutely essential in order to maximize the accuracy and usefulness of the navigational aid. Registration has been achieved in prior rear projection cathode ray tubes by the use of complex and expensive optics and at a sacrifice of space. When space is at a premium, however, and it is desired to employ a simplified optical projection system, as is the case when a rear projection CRT is to be installed in the plane's cockpit, prior constructional techniques are found wanting.

The CRT of the present invention distinguishes itself in being capable of obtaining, by the use of simplified optics, precise registration of related video and visual displays. This is accomplished by a novel tube construction that achieves a substantial reduction, over prior tubes, in the minimum spacing required between the electron gun and optical projection axes. The closer the two axes, the less complex need be the projection system.

Accordingly, it is an object of the present invention to provide a new and improved rear projection CRT.

It is another object to provide a rear projection CRT which finds useful application in a display system having only a simple optical projection system.

It is still another object of the invention to provide a rear projection CRT which lends itself to space economy.

A further object is to provide a unique rear projection CRT for developing on a display screen a video pattern and a related visual image superimposed on and in perfect registry with each other.

An additional object of the invention is to provide a rear projection CRT having a much smaller separation between its rear projection window and its neck than obtainable heretofore.

A rear projection cathode ray tube, constructed in accordance with one embodiment of the invention, comprises a flat, glass faceplate having a translucent phosphor display screen affixed to its internal surface. There is a flat, glass rear plate parallel to the faceplate and having an overall area less than that of the display screen. A funnel section is sealed to and connected between the plates. The CRT also has a glass neck one end of which is frit sealed to the periphery of an aperture formed in the rear plate. The neck contains an electron gun structure for facilitating the development of an electron beam which may be intensity modulated by video information and swept over the display screen to produce a two-dimensional video presentation representative of the video information. An optically flat and clear window is provided in the rear plate and through this window a visual image may be projected onto the display screen and superimposed on the video presentation, the combined visual-video display being viewable from in front of the faceplate. Frit sealing of the neck to the glass rear plate results in negligible distortion of the rear plate thereby permitting the window to be located immediately adjacent the neck.

The features of this invention which are believed to be new are set forth with particularity in the appended claims. The invention, together with further objects and advantages thereof, may best be understood, however, by reference to the following description in conjunction with the accompanying drawing in which:

FIG. 1 schematically illustrates a visual-video display system including a rear projection cathode ray tube (shown by a side view and partially in section) constructed in accordance with the invention;

FIG. 2 is a top or plan view of a major portion of the cathode ray tube of FIG. 1;

FIG. 3 is a rear sectional view of the CRT taken along section line 3—3 of FIG. 1; and FIG. 4 shows, in greater detail and on an expanded scale, a portion of the FIG. 1 view of the rear projection cathode ray tube.

The rear projection cathode ray tube of the disclosed display system has a circular shaped, flat, glass faceplate 12 and a non-circular shaped, flat, glass rear plate 14 which is parallel to faceplate 12 but has an overall area substantially less than that of the faceplate. A glass funnel section 16 is sealed to and connects plates 12 and 14. Preferably, a frit sealing technique is employed to join section 16 to the front and rear plates as indicated by the frit butt seals 17.

The irregular truncated conical-pyramidal glass envelope, formed by plates 12 and 14 and funnel section 16, is most unusual. As will be seen, the CRT must simultaneously accommodate two light-projected images and a scanning electron beam. The irregular shaped bulb configuration has effectively been formed by taking a rear projection CRT of the type having a cylindrical shaped section between equal size front and rear plates and truncating or lopping off those portions of the envelope through which no electron or light beams extend, namely those portions which are not needed to provide clearance for the beams. Such a bulb configuration achieves space economy since it maximizes the space available around the funnel section for mounting or packing of some of the circuitry included in the display system.

A translucent phosphor display screen 18 is affixed to and covers substantially the entire internal surface of faceplate 12. Before the screen is applied, however, the surface of faceplate 12 is preferably ground or sandblasted to provide a frosted appearance which is effective to diffuse projection lamp filament images and thus avoid hot spots. The frosted surface of plate 12 also contributes to the translucent property of screen 18.

A thin transparent coating of an electrical conductive material, such as tin oxide, is preferably applied to the ground surface of faceplate 12 before the phosphor screen is affixed. The conductive coating, which is connected to the high voltage connection to the CRT, bleeds off any static charges that may build up on screen 18. Of course, if screen 18 were aluminized there would be no need for a conductive coating between the screen and faceplate. Aluminizing is not desired, however, since it would tend to defeat optical projections. In other words, the projected images would be partially, if not completely, reflected back.

If desired, a laminated transparent filter glass safety or implosion panel may be bonded to the external surface of faceplate 12.

Glass rear plate 14 contains a pair of optically flat and clear windows or ports 19, 20 (namely, the windows are constructed of clear glass having their two surfaces flat and parallel), and a circular shaped aperture 21 to the periphery of which a cylindrical shaped glass neck 22 is attached in a manner to be described. The particular layout of the elements of plate 14 results in a significant space saving. The larger of the two projection windows, namely window 19, is large enough to permit an optical projector 25 to project a visual image through the window and onto the entirety of display screen 18. Since port 19 is optically flat and clear, it projects an image without distortion.

The illustrated display system is to be installed in the cockpit of a plane to provide a navigational aid for the pilot. Projector 25 thus constitutes a transparency projector which projects onto screen 19 a navigational chart or map of the area over which the plane is flying, and the projector is so synchronized with the plane's speed and heading that the visual display at all times shows the area beneath the plane.

Although the bulb configuration is non-symmetrical, for a convenient reference a line extending through the tube from the center of circular faceplate 12, and perpendicular to both plates 12 and 14, will be designated the tube axis. It is shown by dashed construction line 27 in each of FIGS. 1 and 2, and by point 27 in FIG. 3. The center (designated by point 28 in FIG. 3) of circular window 19 is offset from tube axis 27. However, an undistorted image may easily be projected through window 19 and onto screen 18 by the use of relatively simple techniques. For example, projector 25 may be constructed so that each film frame or transparency is offset with respect to the optical axis of the projector's lens 25a.

Specifically, as viewed in FIG. 1 the center of each transparency frame would be shifted below the optical axis, the plane of the frame remaining parallel to screen 18. Alternatively, the lens of projector 25 may be customized to appropriately bend the light beams to produce an undistorted image on the entirety of screen 18.

Projection window 20 facilitates the optical projection of additional information on screen 18. A projector has not been shown in the drawing for port 20 but obviously it could take the form of that shown by projector 25. Window 20 is included to facilitate the projection onto screen 18 of so-called alpha-numeric information, such as the plane's altitude, fuel, etc.

Note the extremely close spacing between window 19 and aperture 21. This permits the overall area of rear plate 14 to be relatively small and provides minimum offset of the optical projection from the electron gun axis. Attaching neck 22 along side window 19 (while preserving the optical clarity and surface flatness of the entire window) can only be done, however, by the use of applicant's invention.

More specifically, aperture 21 is counterbored to provide an annular or ring-shaped seat 21a. The end of neck 22, which is to be connected to the periphery of apertures 21, is flared and dimensioned so that it fits perfectly in seat 21a, as best seen in FIG. 4. Note in that figure that the mating surfaces or sealing lands of flared end 22a and seat 21a are parallel to each other to maximize the bonding area. Specifically, the edge surface 22a' of flare 22a is made flat and parallel to the bottom or sealing land of seat 21a.

Although the inevntion may be practiced without providing a seat for receiving neck 22, its presence simplifies the alignment of the neck to plate 14. Moreover, more accurate alignment, both radially and longitudinally, is possible because the mating surfaces may be jigged precisely.

Flare 22a is attached and sealed to seat 21a of aperture 21 by a frit sealing technique. To elaborate, before the neck is inserted in seat 21a, the seat is lined with an appropriate powdered glass frit material. It may, for example, be in paste form. After neck 22 is seated in the frit lined seat, the joint is subjected to heat of a temperature equal to the fusing point of the frit material, as a result of which the frit melts and bonds flared end 22a to the periphery of aperture 21.

As best seen in FIG. 4, the frit seal includes an outer bead portion 29a, an inner bead portion 29b, and an interface portion 29c. The seal area is thus maximized (namely the bond is established over an area substantially greater than that defined by sealing land 22a') to enhance the strength of the joint.

Moreover, by employing a frit material with a slightly lower expansion coefficient than that of the glass mating parts, a compression type seal is obtained. The formation of both inner and outer beads is preferred to establish a stable compression seal. The glass of flare 22a and of plate 14 expands very slightly when the joint is heated to fuse the frit. Subsequently when the joint cools, flare 22a and plate 14 contract slightly more than the frit material, placing the frit seal in compression thereby increasing its quality and strength.

The use of frit sealing achieves bonding of the neck to rear plate 14 wtihout disturbing or deforming either the neck or rear plate. This obtains since the temperature required to make the frit seal is substantially below that which would cause any appreciable deformation of the glass of which plate 14 is constructed or the glass of which neck 22 is made. The two surfaces of plate 14 remain flat and parallel. As a consequence, the optical properties of rear plate 14 are undisturbed and thus the entirety of window 19 will remain optically flat and clear, even the portion closest to frit seal bead 29a. Hence, it is due to the absence of negligible distortion in the area where the neck is joined to the rear plate that permits locating window 19 immediately adjacent to the neck.

In the past any time the neck portion of a CRT was to be attached to the remainder of the tube, conventional flame sealing was always used. The mating glass parts were heated to the temperature required to melt and fuse the parts together. In the process, glass deformation would occur on both sides of the joint and over a substantial area. With flame sealing it would not be possible to position an optically flat and clear window immediately alongside the joint, as is the case in applicant's CRT, since the optical properties of the window would suffer from the high temperature required to make the flame seal.

Moreover, when flame sealing is employed the parts to be joined must necessarily have larger dimensions than actually needed due to the distortion and deformation likely to take place during the sealing operation. Applicant's novel technique, on the other hand, permits precision forming of the glass parts to be joined inasmuch as no glass deformation occurs when the bond is established. Hence, neck 22 and aperture 21 need be made only as large as necessary to accomplish their intended purposes. No allowance must be made for glass distortion. In addition, it is possible to make a sharp transition in shape from a flare to a flat.

Neck 22 contains an electron gun structure which may be of conventional construction. Thus, it has been schematically illustrated in FIG. 1 merely by the dashed block 22b. The axis of the electron gun is indicated by dashed construction line 31 in FIG. 1 and by point 31 in FIG. 3. It will be observed that the electron gun axis is parallel to but offset from tube axis 27. Although not essential in practicing the invention, in the particular illustrated embodiment the points at which axes 31 and 27 intersect rear plate 14 and the center point 28 of window 19 are colinear, namely all three lie on the same straight line.

Even though the electron gun axis does not coincide with the tube axis, no difficulty is encountered in sweeping or scanning the electron beam, developed by gun structure 22b, over the entire surface of phosphor screen 18. This can be achieved by appropriate wave shaping of the deflection signals applied to the deflection yoke structure 34 mounted around neck 22.

Radar circuitry for controlling the operation of the tube's electron beam is schematically illustrated by a single block 36. Connections are shown from block 36 to yoke 34, to the pins at the base of neck 22, and to the high voltage connector 38 which connects to the second anode of the cathode ray tube. In response to signals transmitted by the radar equipment and reflected back to and picked up by its antenna, radar information is developed in circuitry 36 and utilized to intensity modulate the CRT's electron beam. As a result, a two-dimensional radar presentation, representative of the radar information, is produced on screen 18.

The terrain, over which the plane is flying, will thus be shown by the radar picture. Both the radar display and the visual display, produced by projector 25, will cover the entire display screen, each display being superimposed on the other. At any given instant, the visual image projected through window 19 will be a map of the area beneath the plane and the size of that area will be identical to the size of the area illustrated by the radar presentation. With appropriate synchronization, the area covered by the projected map will be made identical to that covered by the radar presentation and the visual image will coincide perfectly with the radar display. The combined visual-video display is, of course, viewable by the pilot from in front of faceplate 12.

Aperture 21 is chamfered or beveled around its edge closest to faceplate 12 to provide a chamfer 21b (see FIG. 4), the effect of which is to maximize the electron beam clearance.

The function of window 19 is not limited to transmitting light images to display screen 18. It can be employed to perform other useful functions. For example, a camera may be substituted for projector 25 in order to make a film recording of the radar presentation. Alternatively, the optical projection system may be permitted to continue to operate and a camera may be mounted behind window 20 to record on film the combined visual-video display.

Applicant has, therefore, provided a uniquely constructed rear projection cathode ray tube having an optically flat and clear projection window which may be located immediately adjacent to the tube's neck, resulting in a minimization of the separation required between the window and the axis of the electron gun structure. Precise registration of related video and visual displays is thus made possible by the use of relatively simple optics. Moreover, space economy is obtained since the optical projection system may be mounted or packed alongside the tube's neck. Furthermore, the overall area of the rear plate may be minimized which in turn reduces the space requirements for the CRT and maximizes the space available around the funnel section for mounting of circuit components.

While a particular embodiment of the invention has been shown and described, modifications may be made, and it is intended in the appended claims to cover all such modifications as may fall within the true spirit and scope of the invention.

I claim:

1. A rear projection cathode ray tube comprising:
   a flat, glass faceplate having an internal frosted surface and a translucent phosphor display screen affixed thereto;
   a flat, glass rear plate parallel to said faceplate and having an overall area less than that of said display screen;
   a funnel section sealed to and connected between said plates;
   a glass neck one end of which is frit sealed to the periphery of an aperture formed in said rear plate and containing an electron gun structure for facilitating the development of an electron beam which may be intensity modulated by video information and swept over said display screen to produce a two-dimensional video presentation representative of the video information; and
   an optically flat and clear window provided in said rear plate and through which window a visual image may be projected onto said display screen and superimposed on the video presentation, the combined visual-video display being viewable from in front of said faceplate,
   frit sealing of said neck to said glass rear plate resulting in negligible distortion of said rear plate thereby permitting said window to be located immediately adjacent said neck.

2. A rear projection cathode ray tube according to claim 1 in which said one end of said neck is flared, and in which said aperture is chamfered around its edge closest to said faceplate to maximize the electron beam clearance.

3. A rear projection cathode ray tube according to claim 1 in which said aperture is counterbored to provide a seat for receiving and precisely aligning said neck.

4. A rear projection cathode ray tube according to claim 3 in which said neck is essentially cylindrical shaped, said aperture is circular shaped, said seat is ring shaped, and in which said neck is frit sealed to said seat.

5. A rear projection cathode ray tube according to claim 1 in which the frit sealing produces, at the joint where said neck is joined to said rear plate, a frit seal including an outer bead portion, an inner bead portion, and an interface portion.

6. A rear projection cathode ray tube according to claim 5 in which said one end of said neck has a sealing land which mates with a sealing land around the periphery of said aperture, and in which the interface portion of said frit seal lies between said sealing lands, the outer and inner bead portions of said frit seal substantially increasing the size of the seal area over that established by the interface portion.

References Cited

UNITED STATES PATENTS

| | | | |
|---|---|---|---|
| 2,776,339 | 1/1957 | Arni | 178—7.88 X |
| 3,047,870 | 7/1962 | Bousky | 313—92 X |
| 3,253,086 | 5/1966 | Campbell | 178—7.87 |
| 3,284,655 | 11/1966 | Oess | 313—89 X |
| 3,396,305 | 8/1968 | Buddecke et al. | 313—89 X |

FOREIGN PATENTS

| | | | |
|---|---|---|---|
| 576,204 | 3/1946 | Great Britain | 313—92 |

OTHER REFERENCES

Electronics: Nov. 1, 1957; p. 204.

Kern et al.: IBM Technical Disclosure Bulletin; vol. 7, No. 2; July 1964, p. 144.

ROBERT SEGAL, Primary Examiner

U.S. Cl. X.R.

178—7.8; 220—2.1; 313—64